(12) United States Patent
Avram et al.

(10) Patent No.: US 7,490,871 B2
(45) Date of Patent: Feb. 17, 2009

(54) PIPE CLAMP WITH BUTTON ENGAGEMENT HOLE

(75) Inventors: Aleksandar Avram, Sterling Heights, MI (US); Brian T. Ignaczak, Rochester, MI (US)

(73) Assignee: Breeze-Torca Products, LLC, Auburn Hills, MI (US)

( * ) Notice: Subject to any disclaimer, the term of this patent is extended or adjusted under 35 U.S.C. 154(b) by 0 days.

(21) Appl. No.: 10/906,645

(22) Filed: Feb. 28, 2005

(65) Prior Publication Data

US 2005/0189768 A1    Sep. 1, 2005

Related U.S. Application Data

(60) Provisional application No. 60/547,832, filed on Feb. 26, 2004.

(51) Int. Cl.
F16L 25/00    (2006.01)

(52) U.S. Cl. .................. 285/420; 285/419; 285/373

(58) Field of Classification Search ............... 285/373, 285/371, 398, 419, 420; 24/279
See application file for complete search history.

(56) References Cited

U.S. PATENT DOCUMENTS

| 941,204 | A | * | 11/1909 | Pittman ............... 285/419 |
| 1,901,897 | A | | 3/1933 | Clayton |
| 3,004,781 | A | * | 10/1961 | Morris ................. 285/420 |
| 3,178,208 | A | | 4/1965 | Koehler et al. |
| 3,327,945 | A | | 6/1967 | Pfister |
| 3,565,468 | A | * | 2/1971 | Garrett ................. 285/373 |
| 4,155,574 | A | * | 5/1979 | Hulsey ................. 285/373 |
| 4,312,526 | A | | 1/1982 | Cassel |
| 4,365,393 | A | * | 12/1982 | Hauffe et al. ........... 24/279 |
| 4,372,017 | A | | 2/1983 | Heckethorn |
| 4,629,226 | A | | 12/1986 | Cassel et al. |
| 4,643,465 | A | * | 2/1987 | Green et al. ........... 285/420 |
| 4,813,720 | A | | 3/1989 | Cassel |
| 5,026,096 | A | * | 6/1991 | Lutz, II ................ 285/373 |
| 5,588,680 | A | | 12/1996 | Cassel et al. |
| 6,089,624 | A | | 7/2000 | Cassel et al. |
| 6,269,524 | B1 | | 8/2001 | Cassel |
| 6,519,815 | B2 | | 2/2003 | Cassel et al. |
| 6,832,786 | B2 | | 12/2004 | Duncan et al. |
| 6,942,253 | B2 | | 9/2005 | Bowater |
| 2002/0014772 | A1 | | 2/2002 | Amedure et al. |
| 2005/0099001 | A1 | | 5/2005 | Cassel |

* cited by examiner

*Primary Examiner*—Aaron M Dunwoody
(74) *Attorney, Agent, or Firm*—Reising, Ethington, Barnes, Kisselle, P.C.

(57) ABSTRACT

A pipe clamp for connecting two pipe ends together. The pipe clamp includes a clamp component in the form of an open band of metal extending from a first flange to a second flange. A sleeve is located within the band, and the pipe clamp includes a tightening mechanism for drawing the two flanges together to tighten the clamp. The clamp and sleeve components each have first and second openings that are aligned with the openings in the other component. These openings are sized to receive a button located on the outer surface of each of the pipe ends to thereby allow the clamp to be loosely attached to the pipe ends prior to tightening of the clamp.

23 Claims, 3 Drawing Sheets

PIPE CLAMP WITH BUTTON ENGAGEMENT HOLE

CROSS-REFERENCE TO RELATED APPLICATION

This application claims the priority of U.S. Provisional Application No. 60/547,832, filed Feb. 26, 2004, the entire contents of which are hereby incorporated by reference.

TECHNICAL FIELD

This invention relates to pipe clamps for securing pipe ends together.

BACKGROUND OF THE INVENTION

Automotive exhaust pipes are typically routed along the underbody of a vehicle and may take winding paths between the exhaust manifold, catalytic converter, and muffler depending upon the design and location of other components of the vehicle. In order to avoid obstructions and for underbody packaging purposes, it is often necessary for the exhaust pipe to include one or more bends along its length. Such exhaust pipes can be manufactured in separate sections between at least some of the bends, positioned in an end-to-end axial configuration, and then connected together by a pipe clamp to form an assembled exhaust pipe. In an automotive assembly plant, the first step of this process may be performed while a vehicle is actually flipped upside down, giving an operator access to the underbody. The pipe clamps are typically not tightened until the vehicle is again flipped right side up. As a result, it is not unusual for the loosely-connected exhaust pipe ends and pipe clamps to dislodge when the vehicle is flipped back to its normal orientation, or to become dislodged simply when the vehicle is progressing to a subsequent assembly stage. When this happens, the assembly process is disrupted and consequently becomes less efficient.

In such applications, the pipes are usually positioned and connected together either as a lap joint, with the pipe ends telescopically overlapping each other, or as a butt joint, with the pipe end edges abutting each other. For lap joints, a band clamp is commonly used to clamp the two pipe ends together and is attached over the outer pipe at a location where the two pipes overlap. For butt joints, a pipe coupler is normally used which spans the juncture of the two abutting pipe ends and includes a clamping mechanism that permits it to be securely clamped over both of the two ends. As used throughout this patent, the term "pipe clamp" broadly includes both band clamps and pipe couplers.

In both lap joints and butt joints the integrity of the seal is at least partially dependent upon pipe end positioning. In lap joints, if the pipe ends are overlapped too far, the excess pipe material becomes waste. Conversely, if the pipe ends are not overlapped far enough, an adequate seal may not be provided. For butt joints, an inadequate seal can result if the pipe end edges are not positioned to properly abut each other. A further performance-related consideration involves the seal strength of the clamp over time. It is not uncommon for some clamping mechanisms to experience some degree of decreased sealing performance as the clamp ages. However, designs that rely upon the resilient properties of one or more clamp components to improve the strength of the seal, can oftentimes only be used once. Thus, reusability of the clamp may be limited.

SUMMARY OF THE INVENTION

The present invention is directed to a pipe clamp for securing first and second pipe ends together using a button protruding from a side surface of at least the first pipe. In one embodiment, the pipe clamp includes a clamp component, a sleeve component, and a tightening mechanism, wherein the clamp and sleeve components have aligned openings that receive the button from the first pipe end. The pipe clamp can be used as a pipe coupler that connects the two pipe ends together in an abutting, end-to-end configuration. The pipe clamp attaches to the first pipe end via the button and attaches to the second pipe end either via its own button that is received in second openings in the band and sleeve, or simply via insertion of the second pipe end into the open axial end of the coupler.

In another embodiment, the pipe clamp includes the band and tightening mechanism with at least the first opening, and can be used as a band clamp for a lap joint connection of the pipe ends in which the band clamp is attached to the first pipe end via its button, with the second pipe end being telescopically inserted into the first pipe end.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

Figure 1:
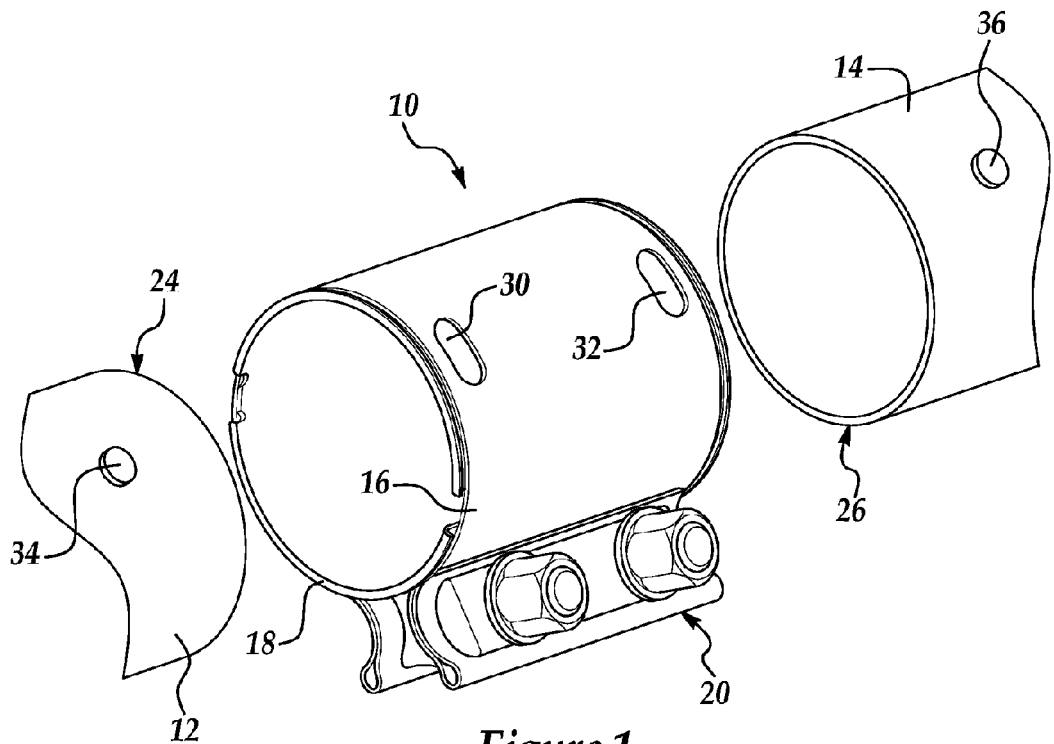
FIG. 1 is a perspective view showing an embodiment of the pipe clamp and latching feature of the present invention, along with two pipe ends.

Referring now to the drawings, the invention will be described according to an illustrative embodiment of a pipe clamp and latching feature, which together better secure a pair of pipe ends to one another. The invention will be described with reference to its use in an automotive exhaust system, however, it will be appreciated as the description proceeds that the invention is useful in many different applications and may be implemented in many other embodiments. In this regard, and as used herein and in the claims, it will be understood that the term "pipe" and "pipe ends" refer not only to automotive exhaust pipes and connecting stubs on exhaust system components, but also to other tubular members of circular or other cross-sectional shape, regardless of whether they are used to carry fluid, and regardless of whether they are made of metal, plastic, or some composite or other material. In addition, the invention may be implemented in both band clamps and pipe couplers so that the invention is useful for both lap joint and butt joint connections.

Figure 2:
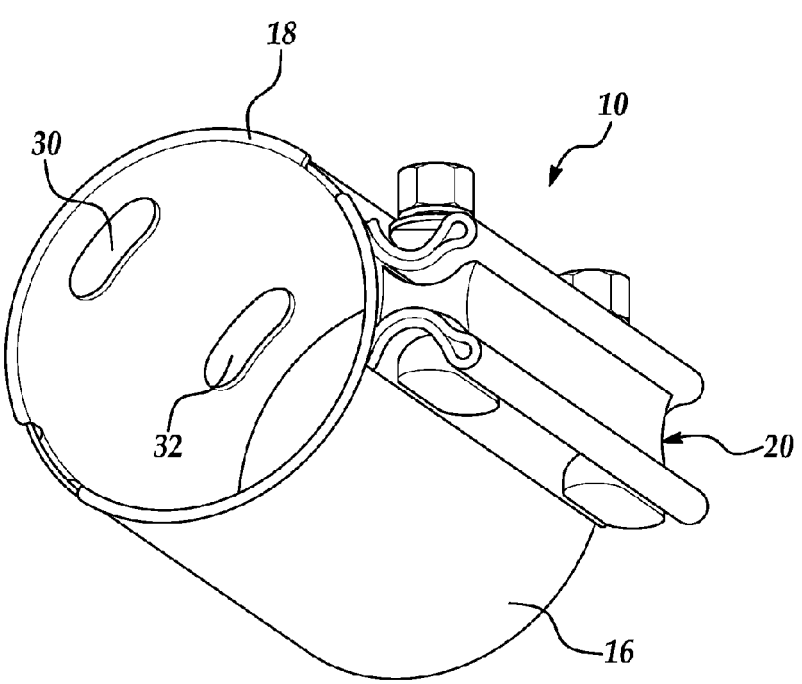
FIG. 2 is a perspective view of the pipe clamp of FIG. 1.
Figure 3:
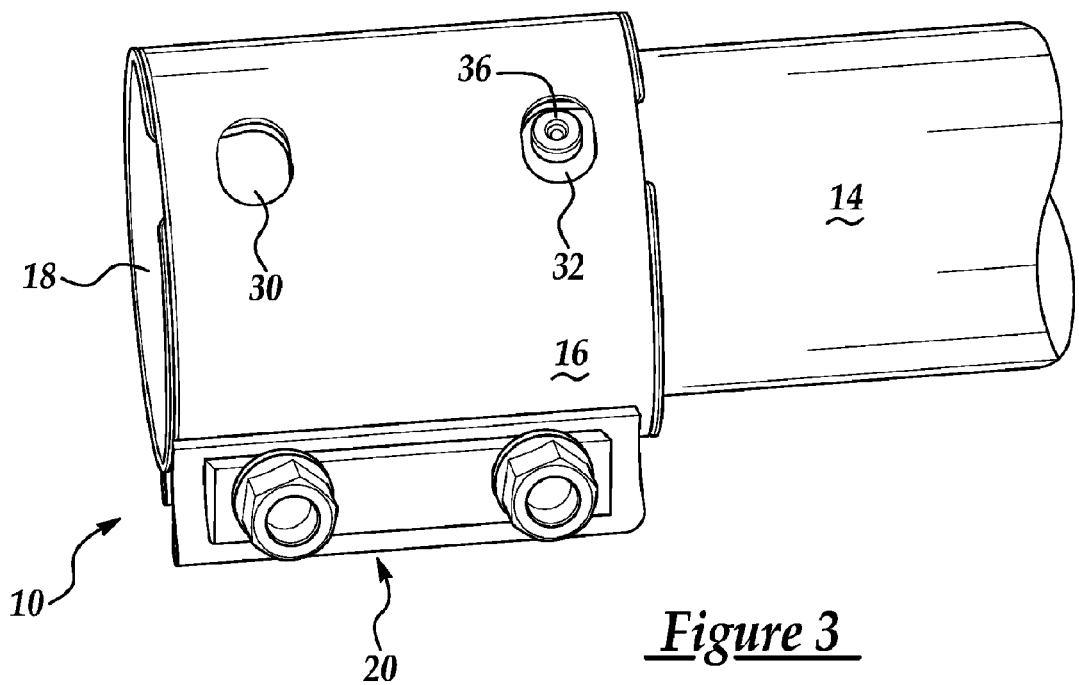
FIG. 3 is a side view of an embodiment of the pipe clamp and latching feature of the present invention, where the pipe clamp is coupled to a single pipe end.

FIGS. 1 and 2 show a pipe clamp 10 in accordance with a preferred embodiment of the present invention, where clamp 10 is used to secure and couple the ends of exhaust pipes 12 and 14 together. Pipe clamp 10 is shown here as a pipe clamp for securing a butt joint, although it could be used to secure a lap joint as well, and generally includes an outer clamp component 16, an inner sleeve component 18, and a tightening mechanism 20. Exhaust pipes 12 and 14 have the same diameter such that pipe ends 24 and 26 abut one another and form an interface at a position located within pipe clamp 10, when the clamp is assembled with the two pipes. Both pipes are primarily made of iron, but can be made of any suitable material for the particular application involved. Exhaust pipes generally have a circular cross-section, however, clamp 10 can be used to couple pipes of various cross-sections and sizes.

Pipe clamp 10 can be made as described in U.S. Pat. Nos. 4,312,526, 6,269,524 or 6,519,815. The entire disclosure of each of these patents is hereby incorporated by reference. As discussed in these patents, inner sleeve component 18 is designed to coaxially surround pipe ends 24 and 26, and is itself coaxially surrounded by outer clamp component 16. The outer clamp component can be drawn tightly around inner sleeve component 18, which can be collapsible due to slotted features in the sleeve (not shown) via tightening mechanism 20. This causes pipe clamp 10 to tighten around the pipe ends and thereby securely maintain them in an abutting fashion. Tightening mechanism 20 preferably includes a fastener such as a bolt and nut to effect the tightening, and can, but need not, include a spline between the confronting ends, as shown in these patents. Pipes 12 and/or 14 can include a SealSlot™ sealing end configuration as disclosed in U.S. Pat. Nos. 4,629,226, 5,588,680 and 6,089,624, the entire disclosure of each of these patents is hereby incorporated by reference.

The latching feature can be implemented in different ways, but in the embodiment illustrated in FIGS. 1 and 2, it includes a pair of openings 30, 32 formed in pipe clamp 10 for receiving buttons 34, 36 which extend from pipe ends 24, 26, respectively. The "pipe ends" broadly refers to the overall end sections of the two pipes, not necessarily the extreme endmost axial surface. The latching feature provides pipe clamp 10 with several advantages over prior art pipe clamps. One advantage is an increase in the strength of the clamp. A substantial amount of force is required to pull pipes 12 and 14 apart when the latching feature of pipe clamp 10 is used. This is because the force would not only have to overcome the frictional force exerted on the outer surfaces of pipes 12 and 14 by the inner surface of inner sleeve component 18, but it would also have to overcome the interlocking force established by openings 30, 32 and buttons 34, 36. Another advantage involves benefits enjoyed during the assembly process. The latching feature allows pipes 12 and 14 to be inserted into pipe clamp 10 such that buttons 34 and 36 are easily aligned with openings 30 and 32, respectively. In addition to efficiently aligning the pipes with respect to the pipe clamp, the latching feature temporarily maintains pipe clamp 10 in a desired position without having to tighten the clamp to its fully tightened state. Thus, additional assembly steps or processes may be performed with the pipe clamp in a temporarily loosened, yet correctly positioned orientation. Furthermore, once pipe ends 24, 26 and their corresponding buttons are inserted into the pipe clamp and openings, pipe clamp 10 can be subsequently tightened without the installer or a second person having to separately hold the pipe ends to prevent relative rotation or other movement. Another advantage is that the operational life of the pipe clamp is extended, as pipe clamp 10 can be reused. Pipe clamps that rely upon the resilient nature or spring-like qualities of one or more of their components can experience a change in the mechanical properties of those components over time; a change that can result in the pipe clamp being used only one time. The latching feature of this embodiment, on the other hand, does not rely upon such resilient properties, and therefore is more likely to be successfully reused. These, of course, are only some of the advantages enjoyed by the illustrated pipe clamp and latching feature, as numerous other advantages also exist. Turning now to FIGS. 3-7, there is shown a second embodiment of the pipe clamp of the present invention that is similar to that of the previous figures, with the exception that the openings formed in the sleeve component 18 are slightly different.

Openings 30, 32 are located on a side surface of pipe clamp 10 and are designed to receive complementary shaped buttons 34, 36, respectively, which extend from a side surface of each of the pipe ends. Preferably, the openings are oval-shaped with the longer axis being generally aligned in the circumferential direction of the clamp and the shorter axis being generally aligned in the axial direction of the clamp. Oval shaped openings provide several advantages. First, the insertion depth of each of the pipes 12, 14 into pipe clamp 10 (that is, the axial position of the very end of each pipe with respect to the pipe clamp) can have an effect on the quality and strength of the seal established by the pipe clamp. By having the shorter axes of the oval-shaped openings 30, 32 aligned in the axial direction, there is less variance or play allowed for the positioning of buttons 34, 36. Accordingly, the insertion depth of each of the pipes will be more accurate, as there is not much tolerance in the axial direction. Second, the angular positioning of pipes 12, 14, with respect to pipe clamp 10, is also of concern when installing the pipe clamp. This alignment, however, is typically not as critical as the insertion depth. Thus, the greater axis of each of oval openings 30, 32 is aligned in the circumferential direction. Hence, there is more tolerance or variance for the angular positioning of the buttons than there is for the axial positioning of the buttons. Preferably, each of the oval openings has a shorter and greater axis or diameter that falls within the range of 5 mm-20 mm. Of course, openings 30, 32 are not limited to oval-shaped openings, as they could be circular, square, rectangular, or any other appropriate shape capable of receiving buttons that protrude from the pipe ends. The openings are preferably located on the same hemispherical section of the pipe clamp as the nuts of tightening mechanism 20. Stated differently, if a plane including the pipe clamp axis were to cut pipe clamp 10 in half such that the nuts of tightening mechanism 20 were separated from the head of the bolts of the tightening mechanism, then openings 30, 32 would be located on the same half of the cut pipe clamp as the nuts. In this manner, an operator can visually inspect the latching feature while tightening the nuts to make sure that buttons 34, 36 are properly located within openings 30, 32. Also, even though the openings shown in the drawings are axially aligned in a straight line (that is, openings 30 and 32 are located at the same angular position on the pipe clamp) it is preferable that they be offset, such that they are not in a straight line. This helps to ensure that the strength of the pipe clamp is not comprised by having multiple openings aligned in a single line. It is also preferable that the openings be located at angular positions that are angularly spaced from any slot feature of inner sleeve component 18. If the opening are located too close to a slot feature, the structural integrity of the sleeve component could be jeopardized.

Figure 4:
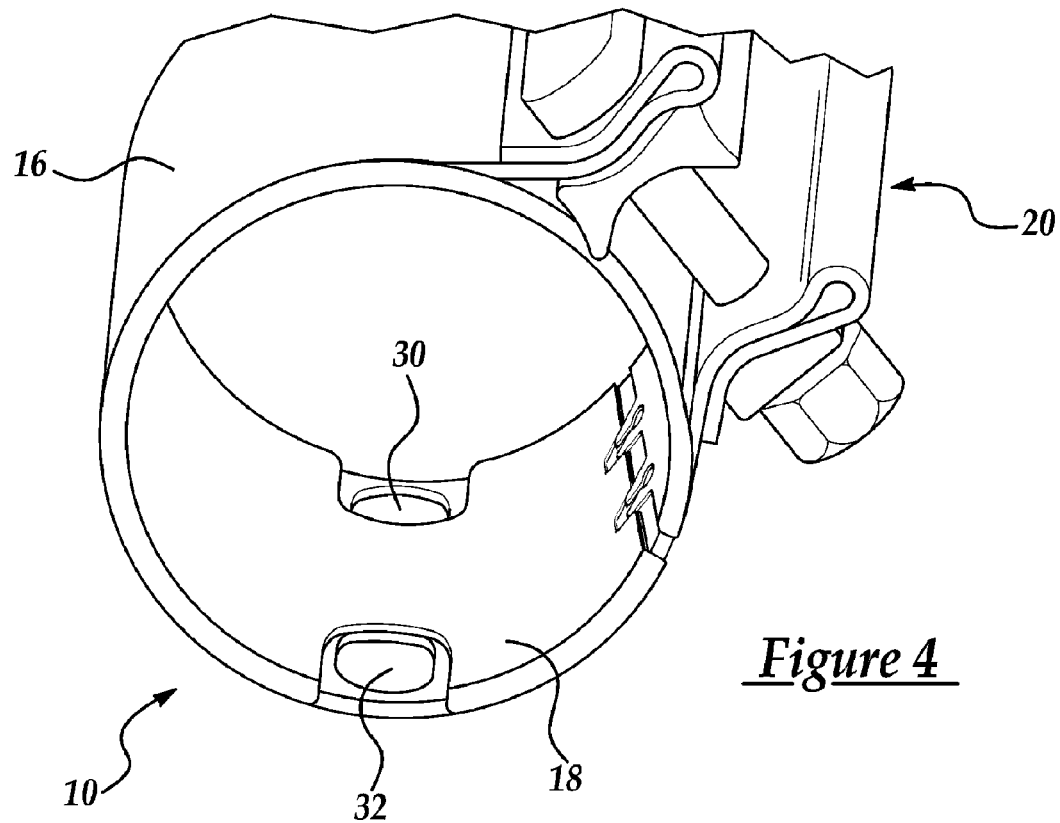
FIG. 4 is a perspective end view of the pipe clamp of FIG. 3.
Figure 5:
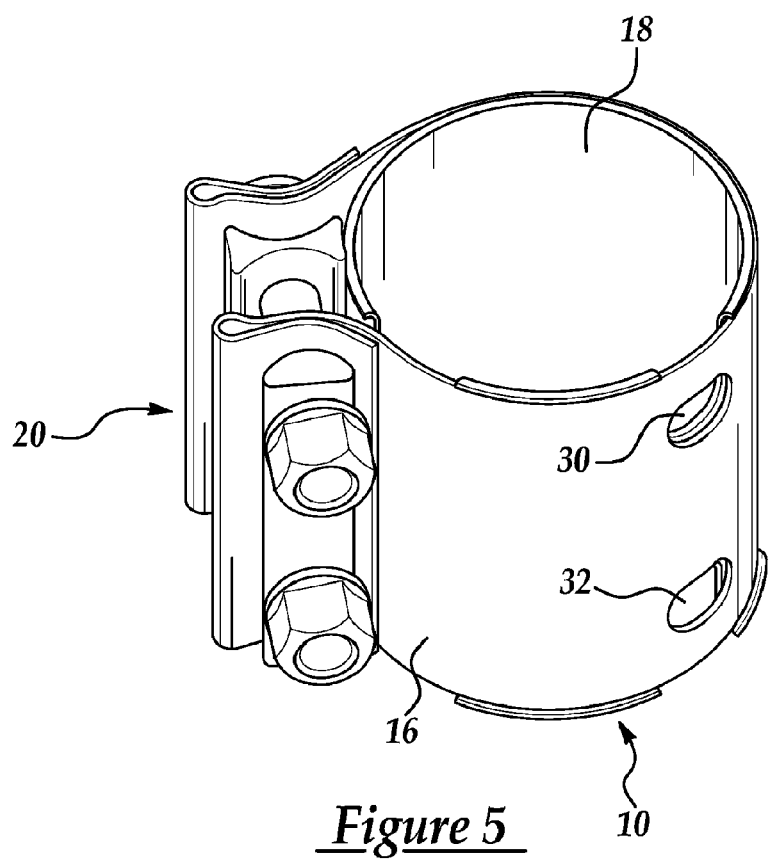
FIG. 5 is a perspective view of the pipe clamp of FIG. 3.
Figure 6:
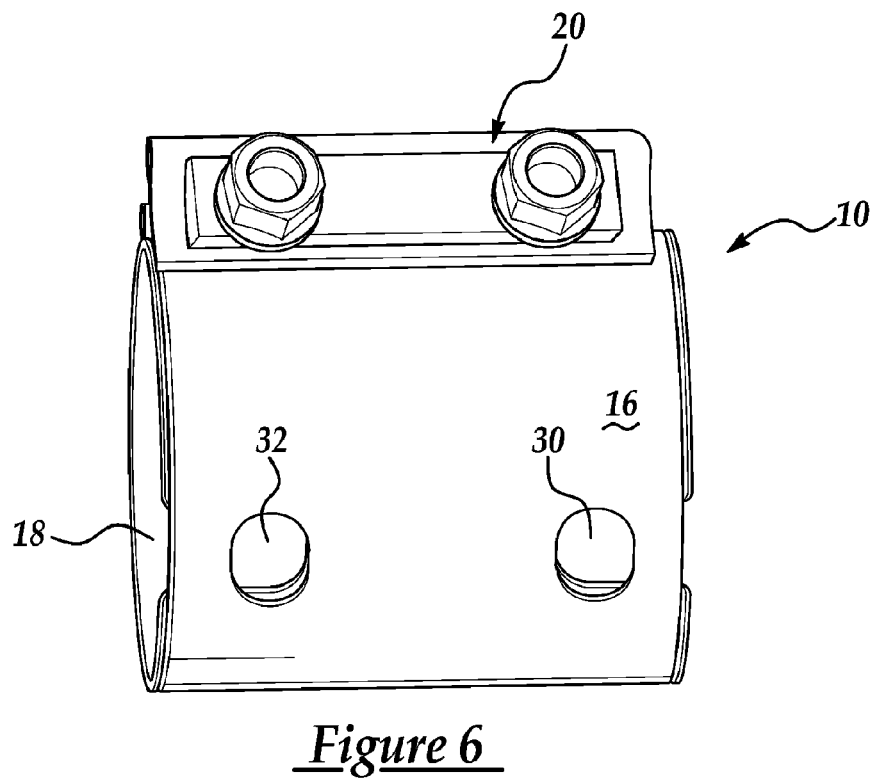
FIG. 6 is a side view of the pipe clamp of FIG. 3.

A difference between the pipe clamp and latching feature embodiments of FIGS. 1-2 versus those of FIGS. 3-7, involves the openings in inner sleeve component 18. As best seen in FIG. 2, openings 30 and 32 of that embodiment pass through the inner sleeve component and are completely circumscribed or surrounded by the sleeve component material; they do not open to the ends of the sleeve. FIG. 4, on the other hand, shows an inner sleeve embodiment where openings 30 and 32 extend all the way to the respective axial ends of the sleeve component. Accordingly, when pipes 12 and/or 14 are being slid into pipe clamp 10, the interior surface of the pipe clamp does not have to ride quite as high over the buttons, as the buttons are actually contacting the interior surface of the clamp component 16, as opposed to the inner surface of sleeve component 18.

Buttons 34, 36 extend from the generally cylindrical side surfaces of pipes 12, 14, and are designed to slide into openings 30, 32, respectively. The buttons can be formed according to one of many shapes such as semi-spherical, square, rectangular, etc., but are preferably cylindrical in shape. As with the openings 30, 32, both the angular and axial position of the buttons can affect the performance of pipe clamp 10. Thus, care should be taken when positioning the buttons so that they line up with their corresponding openings. Buttons 34, 36 should extend away from the cylindrical side surfaces of pipes 12, 14 by a distance sufficient to protrude through the openings in both inner sleeve component 18 and outer clamp component 16 when the pipe clamp is installed. In other words, the axial length of the buttons should be long enough to extend through the openings in both the sleeve and the clamp components. Typically, this distance is between 1 mm-5 mm. It should be recognized, however, that the longer the buttons, the more clearance is needed to slip the pipe clamp 10 over top of the two pipe ends. Additional clearance can be provided by extending the length of the bolts in tightening mechanism 20 such that they allow for a greater spread of the pipe clamp. Of course, the shapes, sizes, and other particulars of both the openings and buttons described above are of preferred embodiments, and could easily differ to accommodate the application.

In fabrication, there are several different methods for forming the openings 30, 32 and buttons 34, 36. According to a first method, which is particularly applicable to the embodiment seen in FIGS. 1 and 2, openings 30, 32 are stamped into pipe clamp 10 after the clamp has been assembled. This stamping operation must sufficiently pierce both inner sleeve component 18 and outer clamp component 16, such that the openings completely extend between the interior side of the clamp to the exterior side. According to this method, buttons 34, 36 are also fabricated after the respective pipes 12, 14 have been formed. These buttons are preferably spot welded onto the outer cylindrical surfaces of the pipe ends at both the correct angular and axial positions, but could be attached according to any appropriate attachment technique known in the art. In the case of a butt joint, buttons 34, 36 are spot-welded at positions so that ends 24 and 26 abut one another. For lap joints, buttons 34, 36 are spot-welded at positions on pipes 12, 14 to provide for a pipe overlap. According to a second fabrication method, which is particularly applicable to the embodiment shown in FIGS. 3-6, openings 30, 32 are formed before the pipe clamp 10 is assembled. This is primarily due to the fact the openings in the inner sleeve component and those of the outer clamp component are not exactly the same shape, which makes it difficult to stamp them at the same time after the pipe clamp has been assembled. The buttons are preferably formed as stated before in the first method. According to a third method of fabrication, pipe clamp 10 is provided with openings 30, 32 already formed (they can be formed by either the first or second methods already described), however, pipes 10, 12 are provided without any buttons on them. After the pipes are fitted and positioned within their respective ends of the pipe clamp, a stud welder or other device is brought into position and welds a stud to the pipes such that it extends through the openings. In this manner, the buttons are attached after the pipe clamp has received the pipes.

In assembly, pipes 12 and 14 are first aligned with and inserted into pipe clamp 10. In the case of a butt joint, the two pipes are brought into axial abutment, where in a lap joint, one of the two pipes telescopically overlaps the other. Insertion of the buttons into their respective openings can be accomplished either by rotating the pipes, with respect to the pipe clamp, and/or by axially inserting or retracting the pipes, with respect to the pipe clamp. In any case, each pipe is manually or automatically maneuvered such that the pipe clamp slides up over top of the button, until the button lines up and slips into the opening. Once a button lines up with the appropriate opening, it will slide into the opening and prevent disengagement of the pipe from the pipe clamp. The pipe clamp could be arranged such that the clearance between the buttons and the pipe clamp is so tight that once the button is aligned with the opening it snaps into place, thereby firmly maintaining the two components together. Either way, the two pipes and the pipe clamp become temporarily secured in the proper relative position (it is temporary because tightening mechanism 20 has not been fully tightened) so that additional assembly steps can be performed without tightening the clamp or causing the pipes to become disengaged. Furthermore, the pipe clamp can be subsequently tightened without having to manually hold the two pipe ends in the proper position, as the latching feature prevents relative rotation of the pipes during tightening. To separate the two pipes, the tightening mechanism is simply loosened and the pipe clamp is spread such that the buttons become retracted from the openings. Of course, other assembly techniques and sequences of steps could be used as well. For instance, the two pipes could first be coaxially aligned, followed by the pipe clamp being slid over top of pipe 12 or pipe 14 from the opposite pipe end, instead of inserting both of the pipe ends into the pipe clamp at the same time.

It is to be understood that the foregoing description is not a description of the invention itself, but of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above or where the statement specifically refers to "the invention." Various other embodiments and various changes and modifications to the disclosed embodiment(s) will become apparent to those skilled in the art. For example, rather than welding or otherwise attaching the button onto the pipe, the button can be formed from the pipe itself by stamping or other deformation of the pipe wall. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

What is claimed is:

1. A pipe clamp for securing first and second pipe ends together using a button protruding from a side surface of at least the first pipe, said pipe clamp comprising:
   a clamp component formed as an open band extending circumferentially from a first end to a second end, said band having a first opening located on a side surface of said band;
   a sleeve component positioned within said band and having a first opening that is aligned with said first opening of said band; and
   a tightening mechanism that includes at least one fastener connected to said ends of said clamp component to draw said ends together for tightening of said clamp component;
   wherein said first openings are sized to receive the button such that disengagement of said pipe clamp from the first pipe end is restricted due to engagement of the button with at least one of said components at its first opening.

2. A pipe clamp as defined in claim 1, wherein said sleeve and clamp components each includes a second opening, and wherein said second openings are aligned with and overlap each other such that they are capable of receiving a second button that protrudes from a side surface of the second pipe end.

3. A pipe clamp as defined in claim 2, wherein said first and second openings are located at different angular positions on said pipe clamp.

4. A pipe clamp as defined in claim 2, wherein said first and second openings are located at angular positions that are angularly spaced from a slot feature of said sleeve component.

5. A pipe clamp as defined in claim 2, wherein at least one of said first and second openings is in the shape of an oval.

6. A pipe clamp as defined in claim 2, wherein at least one of said first and second pairs of aligned openings are shaped to receive a generally cylindrical button.

7. A pipe clamp as defined in claim 1, wherein said first openings each have one or more dimensions measured across the opening, and wherein the dimensions are each within the range of 5-20 mm.

8. A pipe clamp as defined in claim 1, wherein said pipe clamp is adapted to secure the first and second pipe ends together in a butt joint.

9. A pipe clamp as defined in claim 1, wherein said pipe clamp is adapted to secure the first and second pipe ends together in a lap joint.

10. A pipe clamp as defined in claim 1, wherein said openings have an axial width and a circumferential length, and wherein said circumferential length is greater than said axial width.

11. A pipe clamp for securing first and second pipe ends together, comprising:
    a clamp component formed as an open cylindrical band extending axially from a first axial end to a second axial end, and extending circumferentially from a first flange to a second flange, said band having a first opening in said band located adjacent said first axial end and a second opening in said band located adjacent said second axial end, said first and second openings being circumscribed by material of said band;
    a sleeve component positioned within said band and having first and second openings that are aligned with and underlie said first and second openings of said band, respectively; and
    a tightening mechanism that includes at least one fastener connected to said flanges of said clamp component to draw said flanges together for tightening of said clamp component.

12. A pipe clamp as defined in claim 11, wherein said openings have an axial width and a circumferential length, and wherein said circumferential length is greater than said axial width.

13. A pipe clamp as defined in claim 11, wherein said openings in said sleeve component extend inwardly from opposing axial ends of said sleeve component.

14. A pipe clamp and pipe assembly, comprising:
    at least one pipe having a free pipe end that includes an outer side surface and a button protruding from said side surface; and
    a pipe clamp, comprising:
      a clamp component formed as an open band extending circumferentially from a first end to a second end, said band having a first opening located on a side surface of said band; and
      a tightening mechanism that includes at least one fastener connected to said ends of said clamp component to draw said ends together for tightening of said clamp component;
    wherein said pipe clamp is positioned over said pipe end with said button being located within said first opening of said clamp component such that disengagement of said pipe clamp from said pipe end is restricted by engagement of said button with said clamp component.

15. A pipe clamp and pipe assembly as defined in claim 14, further comprising a sleeve component positioned within said band and having a first opening that is aligned with said first opening of said band.

16. A pipe clamp and pipe assembly as defined in claim 15, wherein said pipe clamp comprises a pipe coupler that can be used to connect said pipe end to another pipe end in an abutting, end-to-end configuration.

17. A pipe clamp and pipe assembly as defined in claim 14, wherein said first opening of said clamp components are aligned such that the protruding axial length of the first button extends outwardly through both of said aligned first openings.

18. A pipe clamp and pipe assembly as defined in claim 14, wherein the openings each have one or more dimensions measured across the opening, and wherein the dimensions are each within the range of 5-20 mm.

19. A pipe clamp as defined in claim 2, wherein said first and second aligned openings in said sleeve and clamp components are located adjacent respective first and second axial ends of the pipe clamp and are the only aligned openings in said sleeve and clamp components that are located adjacent said axial ends.

20. A pipe clamp as defined in claim 11, wherein said first and second aligned openings in said sleeve and clamp components are located adjacent said first and second axial ends, respectively, and are the only aligned openings in said sleeve and clamp components that are located adjacent said axial ends.

21. A pipe clamp as defined in claim 20, wherein said openings in said sleeve component extend inwardly from opposing axial ends of said sleeve component.

22. A pipe clamp as defined in claim 20, wherein said openings in said sleeve component are circumscribed by material of said sleeve component.

23. A pipe clamp as defined in claim 1, wherein said first opening in said sleeve component extends inwardly from an axial end of said sleeve component, and wherein said first opening of said clamp component is circumscribed by material of said clamp component such that, when the button is received in said first openings, said clamp is restricted from disengagement with the first pipe end by engagement of the button with said material of said clamp component.

* * * * *